(12) United States Patent
Tsunoda et al.

(10) Patent No.: US 9,557,234 B2
(45) Date of Patent: Jan. 31, 2017

(54) TORQUE SENSOR AND ELECTRIC POWER STEERING DEVICE

(71) Applicant: NSK LTD., Shinagawa-ku, Tokyo (JP)

(72) Inventors: Mikihiko Tsunoda, Gunma (JP); Tamotsu Oumi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/653,597

(22) PCT Filed: Dec. 22, 2014

(86) PCT No.: PCT/JP2014/006387
§ 371 (c)(1),
(2) Date: Jun. 18, 2015

(87) PCT Pub. No.: WO2015/104766
PCT Pub. Date: Jul. 16, 2015

(65) Prior Publication Data
US 2016/0282208 A1    Sep. 29, 2016

(30) Foreign Application Priority Data

Jan. 9, 2014   (JP) .................................. 2014-002471

(51) Int. Cl.
*G01L 3/00* (2006.01)
*G01L 5/22* (2006.01)
(Continued)

(52) U.S. Cl.
CPC .................. *G01L 5/221* (2013.01); *B62D 6/10* (2013.01); *G01L 3/04* (2013.01); *G01L 3/104* (2013.01); *G01L 3/105* (2013.01); *B62D 5/0409* (2013.01)

(58) Field of Classification Search
CPC ............ G01L 3/101; G01L 3/10; G01L 5/221; G01L 3/105; B62D 6/10; B62D 5/0409; B62D 3/105
(Continued)

(56) References Cited

U.S. PATENT DOCUMENTS 3,593,439 A * 7/1971 Eftefield ................. E02F 3/655
                                                         37/423
4,470,312 A * 9/1984 Thompson ............ G01L 25/003
                                                         73/1.11
(Continued)

FOREIGN PATENT DOCUMENTS

FR       1.153.426        3/1958
JP       59-208431 A     11/1984
(Continued)

OTHER PUBLICATIONS

International Search Report (PCT/ISA/210) dated Feb. 17, 2015, with partial English translation (four (4) pages).
(Continued)

*Primary Examiner* — Max Noori
(74) *Attorney, Agent, or Firm* — Crowell & Moring LLP (57) ABSTRACT

In a torque sensor of an electric power steering device, a natural and comfortable feeling to a driver (driver) is achieved by increasing the physical quantity of the torque sensor around the center of the steering wheel (neutral position). A torsion bar (3) for use in the torque sensor includes a core torsion bar (3A) and a tubular torsion bar (3B). The tubular torsion bar (3B) includes a pair of torsion tubular bar parts (3Ba, 3Bb), accommodates the core torsion bar (3A) in its inside, secures both ends of the core torsion bar (3A) in its inside, and the pair of tubular torsion parts (3Ba, 3Bb) mesh and couple each other by meshing teeth, when the core torsion bar (3A) twists a predefined rotational angle, so that a single torsion bar is configured. The elas-
(Continued)

ticity of the tubular torsion bar (3B) is larger than that of the core torsion bar (3A).

13 Claims, 8 Drawing Sheets

(51) Int. Cl.
     *G01L 3/04*        (2006.01)
     *B62D 6/10*        (2006.01)
     *G01L 3/10*        (2006.01)
     *B62D 5/04*        (2006.01)

(58) Field of Classification Search
     USPC ......... 73/862.08, 862.332, 862.335, 862.193
     See application file for complete search history.

(56) References Cited

U.S. PATENT DOCUMENTS

| | | | |
|---|---|---|---|
| 5,796,013 A * | 8/1998 | Nagata | B21D 1/02 |
| | | | 73/862.325 |
| 6,257,075 B1 | 7/2001 | Bachnak | |
| 6,456,090 B1 | 9/2002 | Ishikawa et al. | |
| 2003/0037622 A1 | 2/2003 | Laidlaw | |
| 2007/0246290 A1 * | 10/2007 | Deshmukh | B62D 6/10 |
| | | | 180/446 |
| 2010/0077870 A1 * | 4/2010 | Sakai | G01L 3/105 |
| | | | 73/862.334 |
| 2012/0118099 A1 | 5/2012 | Bless | |

FOREIGN PATENT DOCUMENTS

| | | | |
|---|---|---|---|
| JP | 5-45239 A | 2/1993 |
| JP | 8-276828 A | 10/1996 |
| JP | 2000-55751 A | 2/2000 |
| JP | 2002-90235 A | 3/2002 |
| JP | 3649057 B2 | 5/2005 |

OTHER PUBLICATIONS

Written Opinion (PCT/ISA/237) dated Feb. 17, 2015, with English translation (six (6) pages).

Extended European Search Report issued in counterpart European Application No. 14878246.9 dated Oct. 19, 2016 (Eight (8) pages).

\* cited by examiner

TORQUE SENSOR AND ELECTRIC POWER STEERING DEVICE

TECHNICAL FIELD

The present disclosure relates to a torque sensor configured to detect torque generated at a rotation shaft in an electric power steering device.

BACKGROUND ART

In one technology, as a vehicle steering device, there is known an electric power steering device (EPS: Electric Power Steering) that applies a steering assistance force to a steering mechanism by activating an electric motor according to a steering force by a driver (a driver) steering a steering wheel (steering wheel). The electric power steering device (EPS) generally includes a torque sensor (torque detection device) that detects the torque generated at a rotation shaft. As a torque sensor in one technology, a technology disclosed in Patent Literature 1 is given, for example. In the torque sensor disclosed in PLT 1, as to a twist amount (torque) of a torsion bar (torsion bar), a rotational displacement with respect to the torque is converted into a physical quantity in roughness and fineness of the magnetic flux by a mountain (protruding part) of the stub, a window of the sleeve of a non-magnetic body, and an excitation coil, and its self-induced electromotive force is measured and converted into a voltage by a circuit. In other words, a torque sensor that detects the voltage to the torque is described. It is to be noted that the torsion bar is a kind of spring using the repulsion force generated when a metal rod is twisted.

In these years, natural and a comfortable steering feeling (feeling of steering) to a driver (driver) is demanded, as a demand for an electronic control unit (ECU: Electronic Control Unit) of the electric power steering device (EPS). For example, high-level control in consideration of the relationship of the road surface repulsion with respect to the steering, convergence, and steering response, and the like is demanded. Even in a method in one technology, it is necessary to control from a low-load region near the beginning (start) of turning the steering wheel to a high-load region near the finishing (end) of the turning, signals of the torque sensor are amplified by hardware or multiplied by software to be used for controlling the electric motor and the like.

CITATION LIST

Patent Literature

PLT 1: JP Patent Number 3649057

SUMMARY OF INVENTION

Technical Problem

Also in these days, however, there are still some opinions that an uncomfortable feeling is recognized in the steering feeling around the center (neutral position) of the steering wheel. This reason is considered that even if the scale factor is increased by software, a quantization error, or a step or a sudden change in a control value is generated by changing control signals at high load when a gain (gain) is increased by hardware, and its influence is made on the steering feeling around the center. Besides, there is a limit in the resolving power and processing capacity in the A/D conversion of the microprocessor (MPU: Micro-Processing Unit) in the electric power steering device (EPS). Therefore, it is necessary to increase the original physical quantity in the torque sensor mechanism (rotational direction displacement with respect to the torque).

The present disclosure has an object of providing an electric power steering device, by which a natural and fantastic feeling is given to a driver (driver) by increasing the physical quantity of the torque sensor mechanism around the center (neutral position) of the steering wheel.

Solution to Problem

There is provided a torque sensor, in one embodiment of the present disclosure, including: a first torsion bar; and a second torsion bar configured to include a pair of torsion bar parts, the pair of torsion bar parts being arranged in parallel to the first torsion bar, being coupled with each other when the first torsion bar twists a predefined rotational angle, and twisting in conjunction with the first torsion bar.

DESCRIPTION OF EMBODIMENTS

Hereinafter, embodiments of the present disclosure will be described with reference to the accompanying drawings.
(Configuration)

Figure 1:
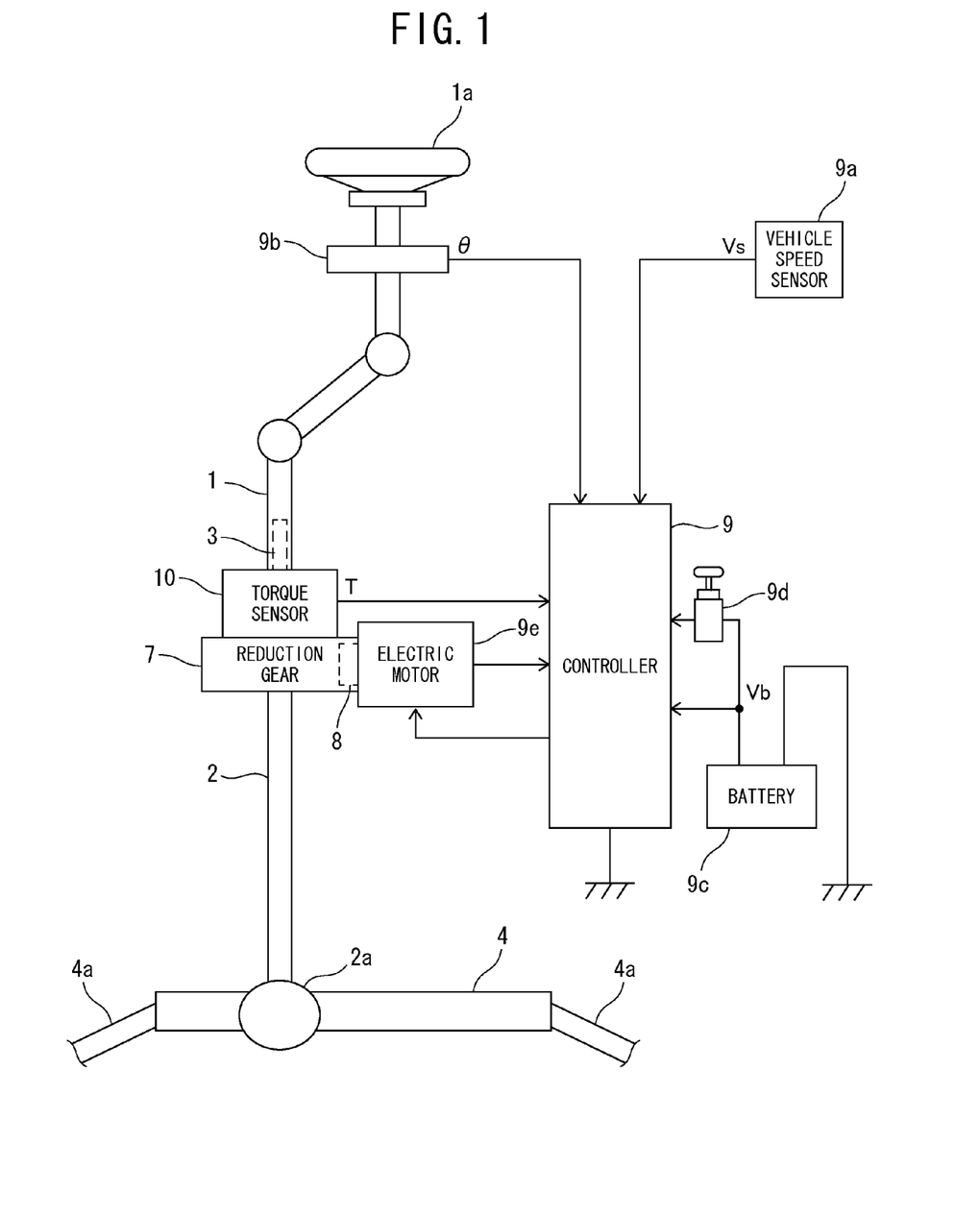
FIG. 1 is a schematic view illustrative of a whole configuration example of an electric power steering device.
Figure 2:
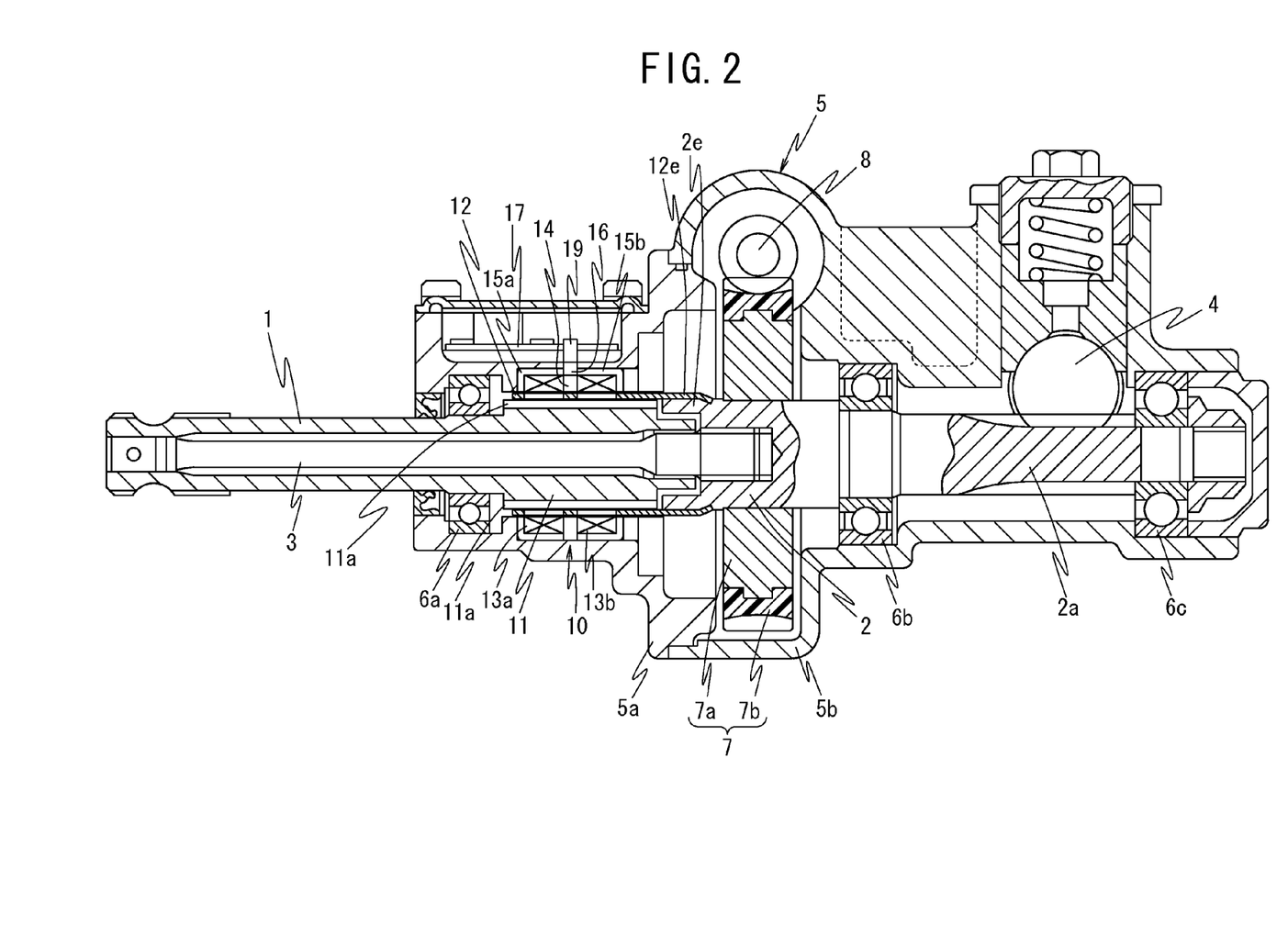
FIG. 2 is a cross-sectional view illustrative of a configuration example of substantial parts of the electric power steering device.

Firstly, a configuration of the electric power steering device including a torque sensor in one embodiment of the present disclosure will be described. FIG. 1 is a schematic view illustrative of a whole configuration example of the electric power steering device. FIG. 2 is a cross-sectional view illustrative of a configuration example of substantial parts of the electric power steering device.

In the electric power steering device, a steering wheel 1*a* is integrally attached with a projected end of an input shaft 1. The input shaft 1 and an output shaft 2 are coupled through a torsion bar 3 arranged inside the input shaft 1. The input shaft 1, the torsion bar 3, and the output shaft 2 are coaxially arranged. The input shaft 1 and the torsion bar 3 are pin-coupled. Also, the torsion bar 3 and the output shaft 2 are spline-coupled. The input shaft 1 transmits steering torque (steering force) applied through the steering wheel 1a by a driver to the output shaft 2 through the torsion bar 3. A housing 5 accommodates and protects the input shaft 1 and the output shaft 2. The housing 5 has a configuration of being divided into two portions of an input shaft side housing portion 5a and an output shaft side housing portion 5b. In the inside of the input shaft side housing portion 5a, the input shaft 1 is rotatably supported by a bearing 6a. Also, in the inside of the output shaft side housing portion 5b, the output shaft 2 is rotatably supported by bearings 6b and 6c. A torque sensor 10 detects torque between the input shaft 1 and the output shaft 2 by detecting a twist amount of the torsion bar 3. In addition, the torque sensor 10 is connected to a controller (ECU: Electronic Control Unit) 9 to notify a torque detection value T to the controller (ECU) 9. The controller (ECU) 9 may be referred to as EPS control unit. Further, the controller (ECU) 9 is configured to obtain (receive inputs of) not only the torque detection value T but also a vehicle speed Vs detected by a vehicle speed sensor 9a and a steering angle θ detected by the steering angle sensor 9b. It is to be noted that the vehicle speed sensor 9a and the steering angle sensor 9b are provided in FIG. 1. However, in fact, the vehicle speed sensor 9a or the steering angle sensor 9b may not be necessarily included. For example, the controller (ECU) 9 is capable of obtaining (receiving inputs of) the vehicle speed Vs and the steering angle θ received from CAN (Controller Area Network) or the like. Here, the controller (ECU) 9 operates when the power is supplied from a battery 9c as a DC power supply. The cathode of the battery 9c is grounded, whereas the anode thereof is connected to the controller (ECU) 9 through two power lines. In two power lines, one power line is connected to the controller (ECU) 9 through an ignition switch 9d for starting the engine, whereas the other power line is directly connected to the controller (ECU) 9 without passing through the ignition switch 9d. The controller (ECU) 9 is configured to determine the steering assistance torque that should be applied to the output shaft 2 based on the torque detection value T, the vehicle speed Vs, and the steering angle θ. In order to apply the steering assistance torque to the output shaft 2, electric current supplied by inverter control from the battery 9c is made to flow and activate an electric motor 9e. It is to be noted that at the output shaft 2, the pinion shaft 2a is integrally formed on an opposite side of the input shaft 1 and the pinion shaft 2a engages with a rack 4 to have a configuration of rack and pinion steering mechanism. An end of the rack 4 is coupled with a tie rod 4a. In addition, at the output shaft 2, a worm wheel 7 that is coaxial and integrally rotates with the output shaft 2 is firmly secured. A tooth portion 7b made of a synthetic resin is integrally secured to a metal hub 7a at the worm wheel 7. Further, the worm wheel 7 engages with a warm 8 driven by an electric motor 9e in the inside of the output shaft side housing portion 5b. The rotational force of the electric motor 9e is transmitted to the output shaft 2 through the warm 8 and the worm wheel 7. By changing a rotating direction of the electric motor 9e appropriately, the steering assistance torque in any direction is applied to the output shaft 2.

Figure 3:
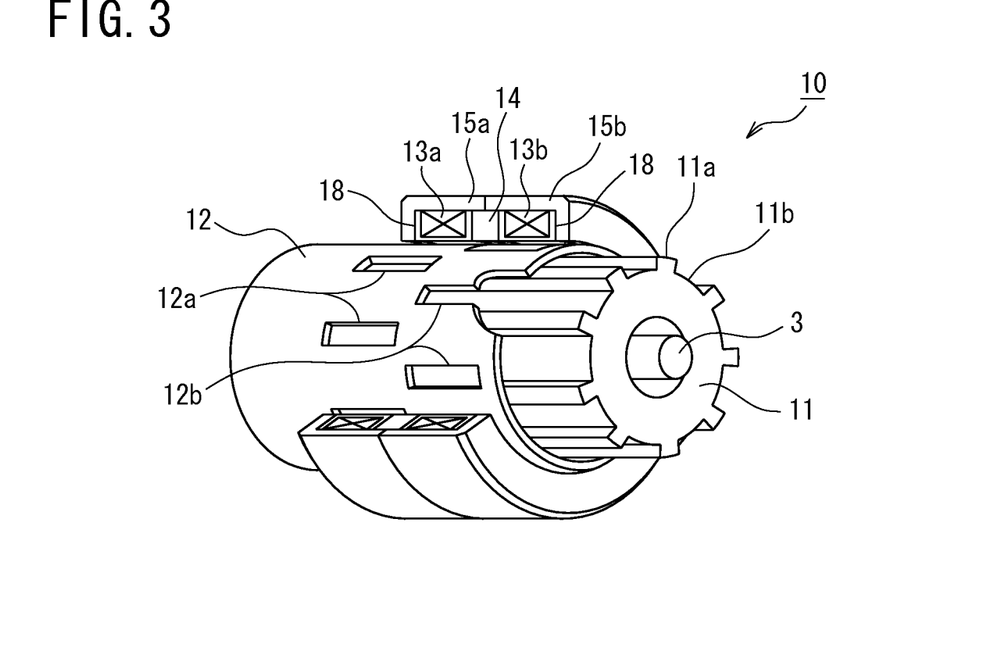
FIG. 3 is a view illustrative of a configuration example of a torque sensor.

Referring to FIG. 3, a configuration of the torque sensor 10 will be described.

In the torque sensor 10, a sensor shaft (rotor) 11 made of a magnetic material is formed at the input shaft 1. On a surface of the sensor shaft 11, as illustrated in FIG. 3, plural (nine, in an example of FIG. 3) protruding lines 11a axially extending are formed at equal interval in a circumferential direction. In addition, depression portions 11b are respectively arranged between the protruding lines 11a. The torsion bar 3 is arranged in the inside of the sensor shaft 11. The inside of the sensor shaft 11 is hollow and the torsion bar 3 is accommodated in the inside of the sensor shaft 11. In the outside of the sensor shaft 11, a cylindrical member 12 having an conductive property when in proximity to the sensor shaft 11 and being composed of a non-magnetic material, for example, aluminum is arranged coaxially with the sensor shaft 11. As illustrated in FIG. 2, an extending portion 12e of the cylindrical member 12 is secured to the outside of an end 2e of the output shaft 2.

The cylindrical member 12 is provided with a first window sequence configured with plural rectangular windows 12a (nine rectangular windows in FIG. 3) respectively arranged at equal interval in the circumferential direction at locations opposing the protruding lines 11a on the surface of the sensor shaft 11, and a second window sequence configured with plural rectangular windows 12b (nine rectangular windows in FIG. 3) respectively having identical shapes to those of the rectangular windows 12a and having different phases in the circumferential direction at locations axially displaced from the first window sequence. The outer circumference of the cylindrical member 12 is surrounded by yokes 15a and 15b holding a coil bobbin 18, around which a pair of detection coils 13a and 13b having identical standards and being arranged at the inside of the input shaft side housing portion 5a are wound. In other words, the detection coils 13a and 13b are coaxially arranged with the cylindrical member 12. The detection coil 13a surrounds the first window sequence configured with the windows 12a, whereas the detection coil 13b surrounds the second window sequence configured with the windows 12b. The yokes 15a and 15b are secured to the inside of the input shaft side housing portion 5a, as illustrated in FIG. 2, and output lines of the detection coils 13a and 13b are connected to a connector (board side connector) 19 of a circuit board 17 arranged at the inside of the input shaft side housing portion 5a through a connector (coil side connector) 16. In addition, as another method, although it is not illustrated, a coil tip section may be solder-secured to a coil side terminal that is press-fit into a coil bobbin 18, be brought into a solder-secured state, be inserted into a board through hall, and be connected by soldering. Here, not only the board side connector 19 but also electronic parts included in an electric circuit of the circuit board 17 are mounted on the surface by reflow soldering, lead soldering, or the like.

It is to be noted that only one torsion bar is included in the mechanism of a generally used torque sensor today. When only one torsion bar is included, only one kind of elasticity can be selected as an elastic property (spring force) of the torsion bar. Therefore, the torque resolution available to detailed control around the center (neutral position) of the steering wheel may not be obtainable. Thus, in one embodiment of the present disclosure, a first torsion bar and a second torsion bar having different elastic properties from each other are provided in the torque sensor mechanism. The first torsion bar is configured to twist firstly, and the second torsion bar is configured to twist next. The torsion bars are configured to twist at plural stages, so that the torque resolution available to the detailed control around the center (neutral position) of the steering wheel can be obtained. Hereinafter, the torsion bars in one embodiment of the present disclosure will be described.

Figure 4:
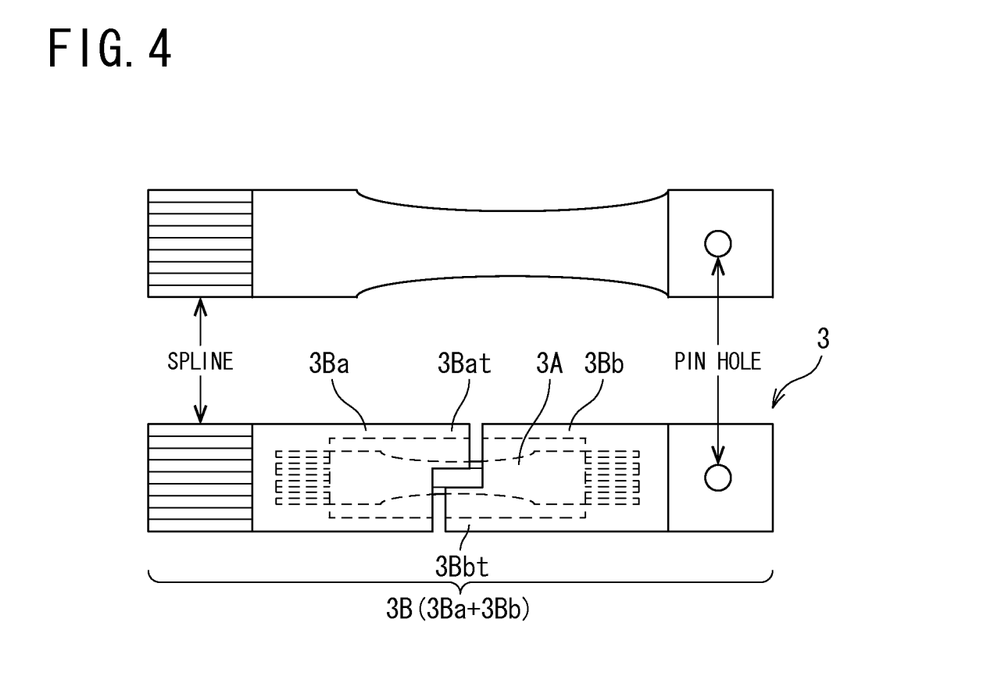
FIG. 4 is a schematic view illustrative of a torsion bar in one embodiment of the present disclosure.

FIG. 4 is a schematic view illustrative of a torsion bar in one embodiment of the present disclosure. The upper view in FIG. 4 illustrates the torsion bar in one technology, whereas the lower view in FIG. 4 illustrates the torsion bar 3 in one embodiment of the present disclosure.

As to the torsion bar 3 in one embodiment of the present disclosure, the first torsion bar and the second torsion bar are arranged in parallel. For example, the second torsion bar is arranged around the first torsion bar. The second torsion bar includes a pair of torsion bar parts that are coupled with each other when the twist of the first torsion bar reaches a predefined rotational angle and twist in conjunction with the first torsion bar. In FIG. 4, as an example of the torsion bar, a core torsion bar 3A is illustrated. The core torsion bar 3A is a torsion bar configuring the central axis. For example, the core torsion bar 3A has a shape in which a torsion bar in one technology is scaled down and its both ends form spline shafts. In addition, as an example of the second torsion bar, a tubular torsion bar 3B is illustrated. As an example of a pair of torsion bar parts, two tubular torsion bars (tubular part) are illustrated. The tubular torsion bar 3B accommodates the core torsion bar 3A in the inside of the two tubular torsion bars, and both ends of the core torsion bar 3A are secured in the inside. When the twist of the core torsion bar 3A reaches a predefined rotational angle, the tubular torsion bar 3B has a configuration such that two tubular torsion bars are coupled with each other by meshing teeth to form a single torsion bar.

Hereinafter, the detailed configuration of the tubular torsion bar 3B will be described.

In FIG. 4, as two tubular torsion bars (tubular parts) included in the tubular torsion bar 3B, a tubular torsion bar 3Ba and a tubular torsion bar 3Bb are illustrated. In FIG. 4, the tubular torsion bar 3Ba is arranged on the spline shaft side in a torsion bar in one technology, whereas the tubular torsion bar 3Bb is arranged on the pin hole side in the torsion bar in one technology. In addition, in the tubular torsion bar 3B, insides of the tubular torsion bar 3Ba and the tubular torsion bar 3Bb are hollow, and accommodate the core torsion bar 3A in the inside. The tubular torsion bar 3Ba is spline-coupled to one end of the core torsion bar 3A in its inside, whereas the tubular torsion bar 3Bb is spline-coupled to the other end of the core torsion bar 3A in its inside. It is to be noted that the spline coupling is merely an example. Thus, the core torsion bar 3A forms the core (center shaft) of the tubular torsion bar 3B. As illustrated in FIG. 4, the tubular torsion bar 3B has a size (size) same with that of the torsion bar in one technology, in a state where the tubular torsion bar 3B accommodates the core torsion bar 3A. Hence, the torsion bar in one technology is replaceable with the tubular torsion bar 3B, and the tubular torsion bar 3B is applicable to the torque sensor in one technology. However, in fact, if the inner diameter or length of the sensor shaft 11 of the torque sensor as illustrated in FIG. 3 can be changed, the tubular torsion bar 3B does not have to have the same size (size) with the torsion bar in one technology. Then, the relationship of the magnitude of the elasticity is configured to satisfy "elasticity of the core torsion bar 3A < elasticity of the torsion bar in one technology < elasticity of the tubular torsion bar 3B". It is to be noted that the repulsion becomes larger as the elasticity is higher.

Figure 5A:
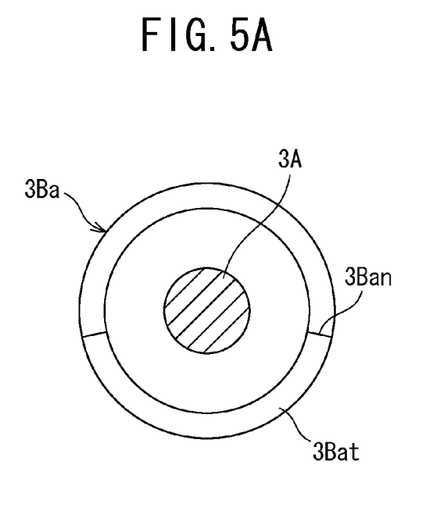
FIG. 5A to FIG. 5D are views illustrative of a configuration example of a tubular torsion bar in a case of a single meshing tooth.
Figure 5B:
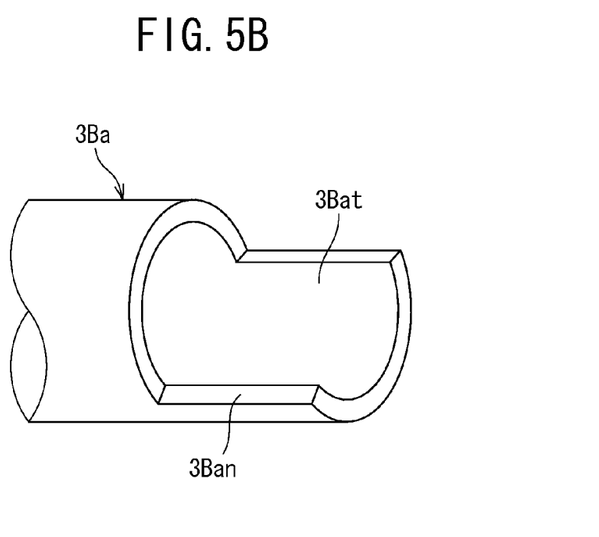
Figure 5C:
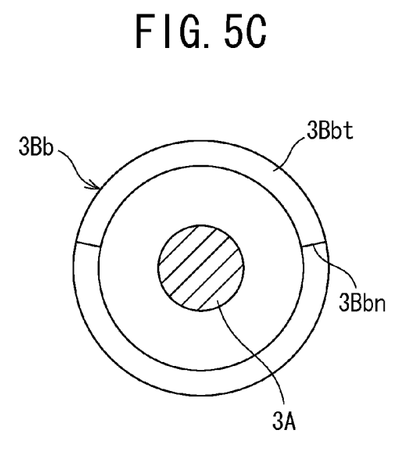
Figure 5D:
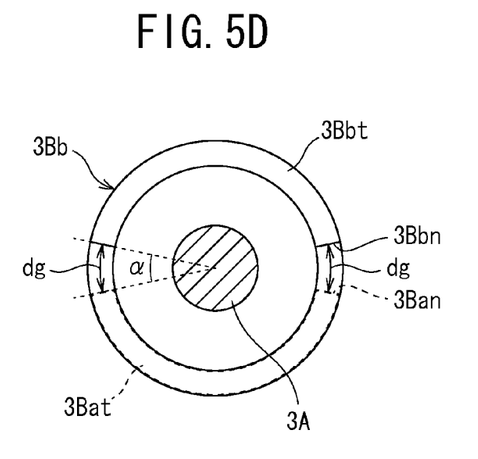

In FIG. 4, the tubular torsion bar 3B has a configuration that a meshing tooth 3Bat of the tubular torsion bar 3Ba and a meshing tooth 3Bbt of the tubular torsion bar 3Bb mesh each other and to be coupled with each other. To be specific, as illustrated in FIG. 5A and FIG. 5B, the meshing tooth 3Bat is formed to axially protrude on an end face on the meshing side of the tubular torsion bar 3Ba, and has an arc shape in the circumferential direction of the end face, when it is plan-viewed from the axial direction. Further, as illustrated in FIG. 5C, the meshing tooth 3Bbt is configured to axially protrude on an end face on the meshing side of the tubular torsion bar 3Bb, and has a similar shape to the meshing tooth 3Bat. It is to be noted that FIG. 5A and FIG. 5C are plane views when the tubular torsion bars 3Ba and 3Bb are viewed from the axial direction (meshing tooth side). In a state where the steering torque is not applied, as illustrated in FIG. 5D, the meshing tooth 3Bbt (indicated by a dotted line) of the tubular torsion bar 3Ba and the meshing tooth 3Bat of the tubular torsion bar 3Bb do not mesh each other, and there is a gap dg having a predefined rotational angle α between the meshing teeth 3Bat and 3Bbt. In other words, in the state where the steering torque is not applied to the tubular torsion bar 3B, the gap dg having a predefined rotational angle α is made between the meshing tooth 3Bbt of the tubular torsion bar 3Ba and the meshing tooth 3Bbt of the tubular torsion bar 3Bb. When the core torsion bar 3A twists at this gap dg and reaches the location (meshing point) where the meshing tooth 3Bbt of the tubular torsion bar 3Ba and the meshing tooth 3Bbt of the tubular torsion bar 3Bb mesh each other, the tubular torsion bar 3B twists. It is to be noted that the tubular torsion bar 3Ba that is axially spline-coupled rotates together with the twist of the core torsion bar 3A, and an end face 3Ban in the circumferential direction of the meshing tooth 3Bbt abuts with an end face 3Ban in the circumferential direction of the meshing tooth 3Bat of the tubular torsion bar 3Bb, so that the meshing tooth 3Bbt of the tubular torsion bar 3Ba and the meshing tooth 3Bbt of the tubular torsion bar 3Bb mesh each other. Further, in order to suppress a movement sound or knocking, an elastic body (elastic member) such as rubber or resin may be filled within the gap of the meshing teeth 3Bat and 3Bbt. For the above purpose, the elastic body may be non-metal, in one embodiment. However, in fact, a metal spring such as a leaf spring, an oil spring, or the like may be arranged as an elastic body at the gap between the meshing teeth 3Bat and 3Bbt.

Figure 6A:
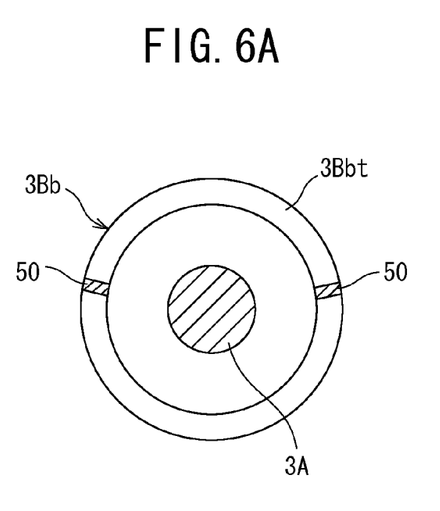
FIG. 6A and FIG. 6B are front views in an axial direction illustrative of a configuration example when an elastic material is arranged in a gap between the meshing teeth.
Figure 6B:
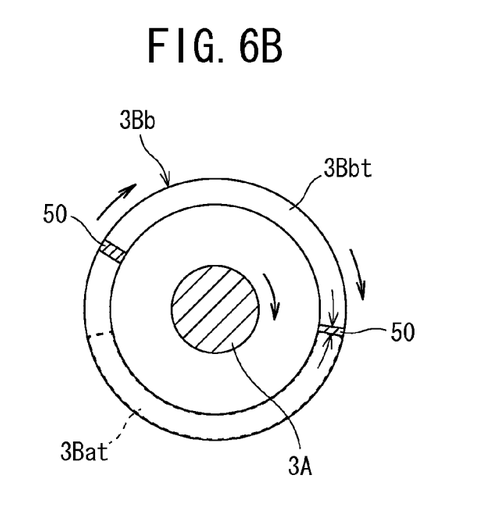

For example, as illustrated in FIG. 6A, by securing an elastic body 50 made of, for example, a resin on the end face 3Bbn of the meshing tooth 3Bbt, the elastic body 50 elastically deforms when the meshing teeth 3Bbt and 3Bat mesh each other, as illustrated in FIG. 6B. Hence, the movement sound or knocking can be suppressed.

Figure 7:
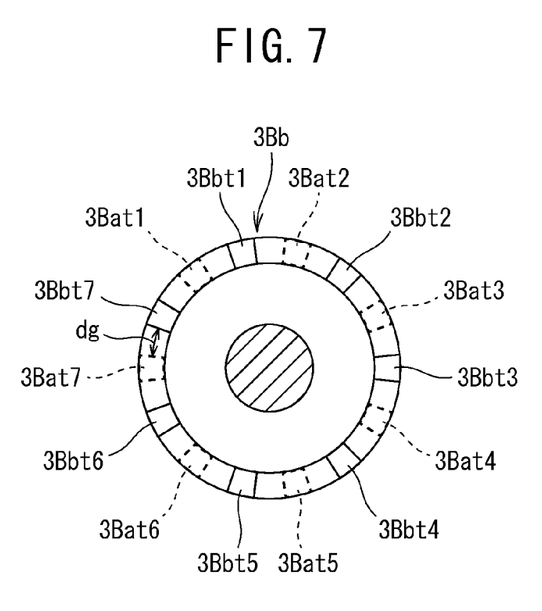
FIG. 7 is a front view in the axial direction illustrative of a configuration example of the tubular torsion bar in a case of seven meshing teeth.

The number of the meshing teeth between the tubular torsion bars 3Ba and 3Bb is assumed to be one to seven. When the number of the meshing teeth is less than one, meshing is not achieved. When the number of the meshing teeth is more than seven, each tooth is too small and it is difficult to produce them. In other words, the reason why the number of the meshing teeth is up to seven is due to the production circumstances, but seven or more meshing teeth may be applicable as long as they can be produced. As the number of the meshing teeth increases, the surface pressure at the time of meshing becomes lower and the durability improves. In addition, as the number of the meshing teeth increases, there are more meshing locations on the circumference, the power disperses, and an inclination rarely occurs at the meshing. In FIG. 4, the number of the meshing teeth is one. It is to be noted that when the number of the meshing teeth is seven, for example, as illustrated in FIG. 7, meshing teeth 3Bat1 to 3Bat7 of the tubular torsion bar 3Ba and meshing teeth 3Bbt1 to 3Bbt7 of the tubular torsion bar 3Bb are alternately arranged in the circumferential direction. Further, gaps dg that are ranges where only the core torsion bar 3A twists are formed between the respective meshing teeth arranged in parallel in the circumferential direction. That is, the length in the circumferential direction of each meshing tooth is determined so that an intended gap dg is secured. When the number of the meshing tooth is two to six, only the number or the width in the circumferential direction is different, but it has a similar configuration.

Moreover, the shape of the meshing tooth is rectangular in FIG. 4, but in practice, any shape is applicable as long as it can mesh. For example, even a triangle or a trapezoid may be applicable, and a corner may be rounded. Alternatively, the gap between the tubular torsion bar 3Ba and the tubular torsion bar 3Bb may be axially slanted with respect to the axial direction, so that a cross section (slope) may be used as a meshing tooth. Further, in FIG. 4, the location of the meshing tooth is around the center of the tubular torsion bar 3Ba and the tubular torsion bar 3Bb. In fact, however, the location may be moved (displaced) from around the center for tuning the elasticity. For example, the torsion bar 3Ba may be made longer or shorter than the tubular torsion bar 3Bb. In addition, any length of the meshing tooth is applicable. For example, a tubular part arranged around the core torsion bar 3A can be formed by extending the meshing tooth. Alternatively, the tubular torsion bar 3Ba and the tubular torsion bar 3Bb can be made to be two torsion bars each having a half cylindrical shape opposing each other with a gap of a predefined rotational angle. Further, in the tubular torsion bar 3Ba and the tubular torsion bar 3Bb, one may be rigid and the other one may be elastic. In other words, the elasticity of the tubular torsion bar 3Bb and that of the tubular torsion bar 3Ba may not be necessarily same (may be different).

In practice, however, the present disclosure is not limited to the above examples.

(Operation)

The input shaft 1 is configured to transmit the steering torque applied through the steering wheel 1a by a driver to the output shaft 2 through the torsion bar 3.

Figure 8A:
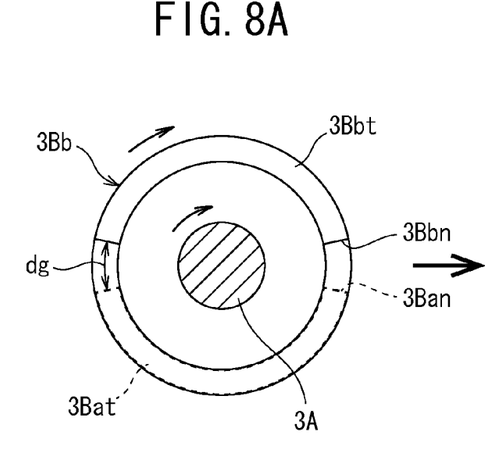
FIG. 8A to FIG. 8D are front views in an axial direction illustrative of an operation example of the torque sensor.
Figure 8B:
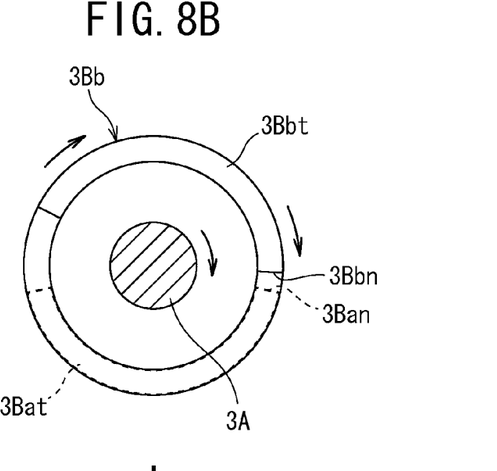

When the steering torque is applied to the torsion bar 3, firstly, the core torsion bar 3A twists, as illustrated in FIG. 8A. Since the core torsion bar 3A is spline-coupled with the tubular torsion bar 3B at the inside of the tubular torsion bar 3B, the core torsion bar 3A and the tubular torsion bar 3B moves in conjunction with each other. Thus, as the torque increases and the core torsion bar 3A twists, as illustrated in FIG. 8B, the meshing tooth 3Bat (indicated by a dotted line) of the tubular torsion bar 3Ba and the meshing tooth 3Bbt of the tubular torsion bar 3Bb gradually come closer to each other.

Figure 8C:
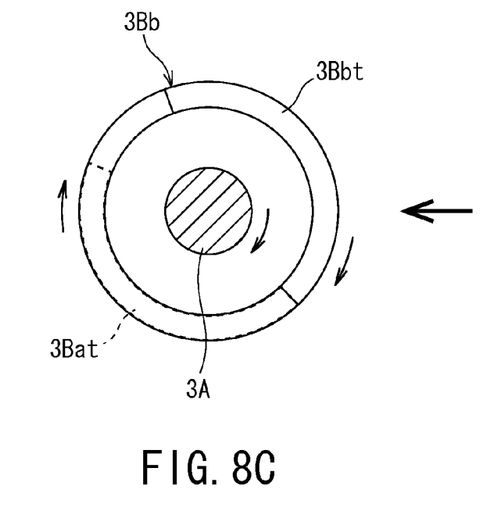
Figure 8D:
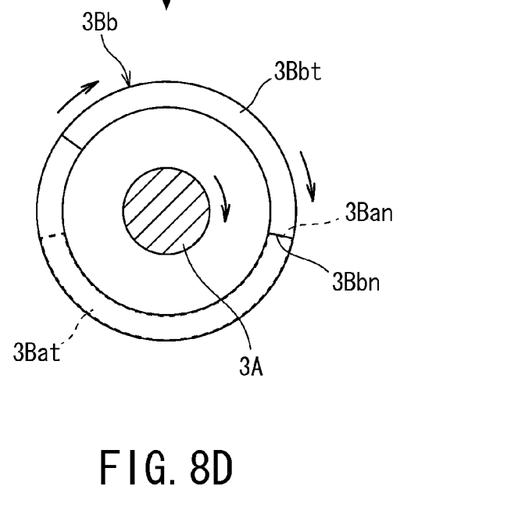

Then, as illustrated in FIG. 8C, it is assumed that the meshing tooth 3Bat of the tubular torsion bar 3Ba and the meshing tooth 3Bbt of the tubular torsion bar 3Bb reach the location of meshing (meshing point). In this case, by meshing the meshing tooth 3Bat of the tubular torsion bar 3Ba and the meshing tooth 3Bbt of the tubular torsion bar 3Bb, the tubular torsion bar 3Ba and the tubular torsion bar 3Bb form a single tubular torsion bar 3B, and the tubular torsion bar 3B twists as illustrated in FIG. 8D.

The torque sensor 10 is configured to detect the twist amount of the torsion bar 3 and to detect each of the twist amounts of the core torsion bar 3A and the tubular torsion bar 3B, so as to detect the torque between the input shaft 1 and the output shaft 2.

Figure 9:
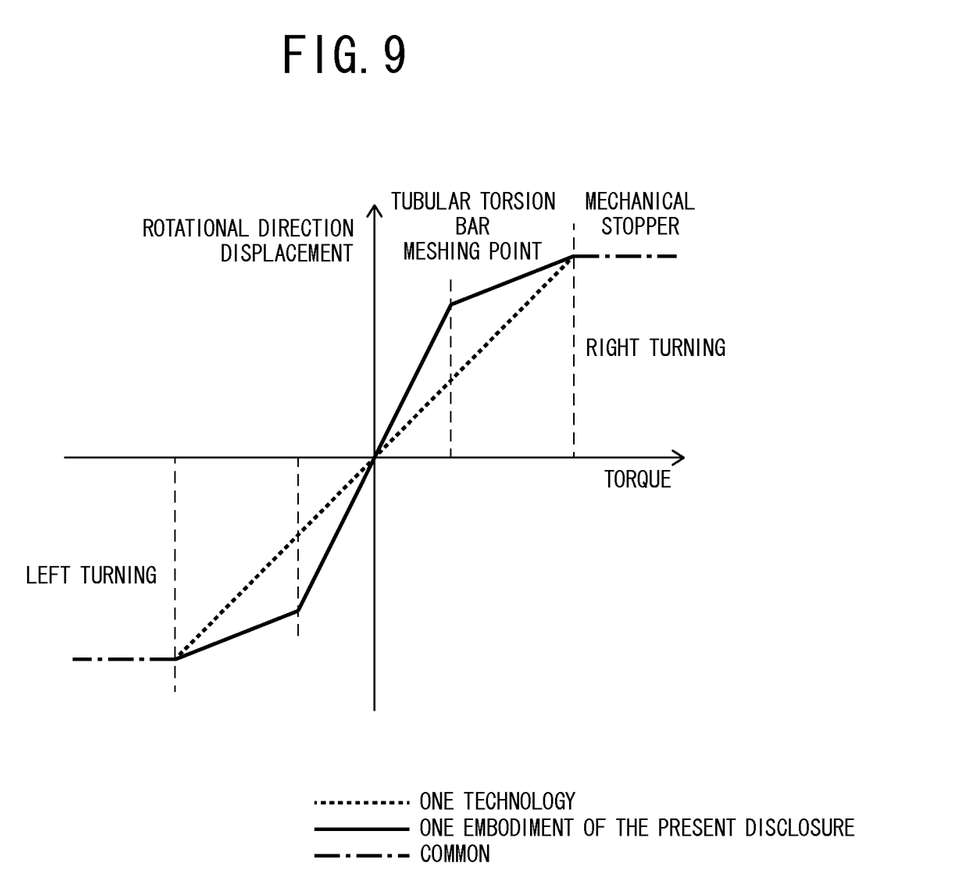
FIG. 9 is a view illustrative of a comparison of a rotational direction displacement with respect to torque.

FIG. 9 is a graph for comparing the physical quantities (displacements in the rotational direction with respect to the torque) in the torque sensor mechanism in a prior art technology with those in one embodiment of the present disclosure.

In the displacement in the rotational direction in one embodiment of the present disclosure, the core torsion bar 3A twists to the meshing location (meshing point) where the meshing tooth 3Bat of the tubular torsion bar 3Ba and the meshing tooth 3Bbt of the tubular torsion bar 3Bb mesh each other. As the torque increases, the displacement in the rotational direction increases to diverse from the displacement in the rotational direction in a prior art technology.

Thus, in one embodiment of the present disclosure, a higher physical quantity of the gain than that in a prior art technology are obtainable, because the relationship of the magnitude of the elasticity satisfies the elasticity of the core torsion bar 3A < the elasticity of the torsion bar in a prior art technology. In addition, such a higher physical quantity of the gain is obtainable and can contribute to the detailed control, so that a natural and comfortable steering feeling can be given to a driver (driver).

Further, when the displacement in the rotational direction in one embodiment of the present disclosure exceeds the meshing location (meshing point) where the meshing tooth 3Bat of the tubular torsion bar 3Ba and the meshing tooth 3Bbt of the tubular torsion bar 3Bb mesh each other, the tubular torsion bar 3B twists. As the torque increases, the displacement in the rotational direction decreases to come closer to the displacement in the rotational direction in a prior art technology due to the elasticity of the tubular torsion bar 3B.

Thus, in one embodiment of the present disclosure, the relationship of the magnitude of the elasticity satisfies the elasticity of torsion bar in a prior art technology < the elasticity of the tubular torsion bar 3B. Hence, when the displacement exceeds the meshing point, the elasticity stronger than that of the conventional torsion bar in a prior art technology is generated, so that the displacement in the rotational direction is suppressed. For this reason, there is no concern that the core torsion bar 3A is twisted too much or the reliability degrades.

MODIFICATIONS

In one embodiment of the present disclosure, a column assist type is assumed as the electric power steering device (EPS). In practice, however, a rack assist type, a pinion assist type, or the like may be used as long as the configuration in one embodiment of the present disclosure is applicable.

Figure 10A:
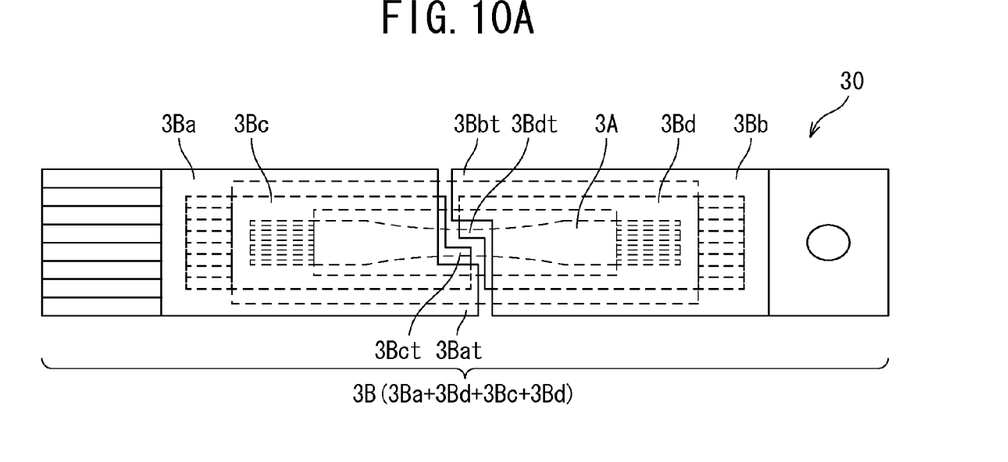
FIG. 10A and FIG. 10B are views illustrative of a configuration example in a case where the tubular torsion bar has a nested structure.

In addition, in one embodiment of the present disclosure, an example where the torsion bar has a two-stage configuration has been described. In fact, however, three stages or more of the torsion bar may be used. As illustrated in FIG. 10A, for example, the tubular torsion bars 3Bc and 3Bd each having a cylindrical shape smaller by one size than that of the tubular torsion bar 3B may be arranged between the core torsion bar 3A and the tubular torsion bar 3B illustrated in FIG. 4. In other words, the tubular torsion bar 3B can be configured to have a nested structure in which plural sets of torsion bar parts (pair of the core torsion bar 3Ba and the tubular torsion bar 3Bb) having different sizes are assembled in an order of size. The inner tubular torsion bars 3Bc and 3Bd are spline-coupled with the outer tubular torsion bars 3Ba and 3Bb at an inner side of the outer tubular torsion bars 3Ba and 3Bb, respectively. It is to be noted that the spline coupling is merely an example. In this situation, by changing the elasticity or stiffness for every stage of the tubular torsion bar, more detailed torque resolution is achievable. It is to be noted that the tubular torsion bar meshes from the inner one sequentially to make the elasticity larger. In other words, the outer one is assumed to have a larger elasticity.

Figure 10B:
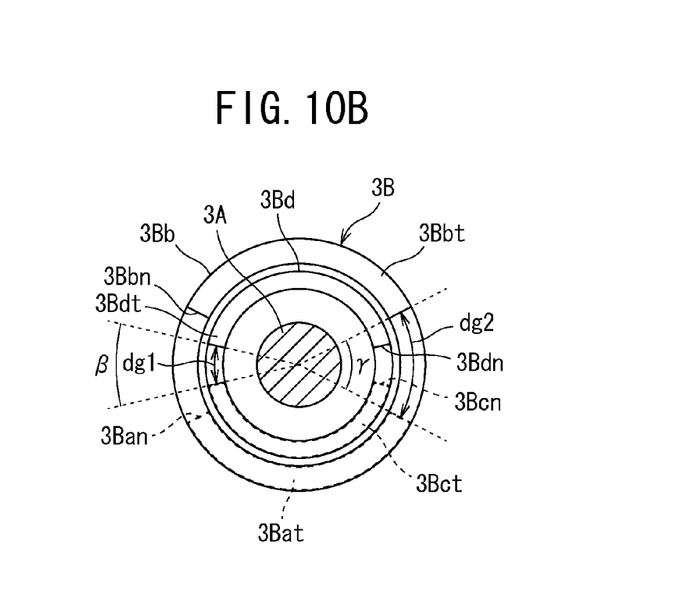

For example, as illustrated in FIG. 10B, in a state where the steering torque is not applied, the inner tubular torsion bars 3Bc and 3Bd are configured such that a gap dg1 corresponding to a predefined rotational angle β is arranged between a circumferential end face 3Bcn of the meshing tooth 3Bct and a circumferential end face 3Bdn of the meshing tooth 3Bdt. In addition, in a state where the steering torque is not applied, the outer tubular torsion bars 3Ba and 3Bb are configured such that a gap dg2 having a predefined rotational angle γ is arranged between a circumferential end face 3Ban of the meshing tooth 3Bat and a circumferential end face 3Bbn of the meshing tooth 3Bbt.

In such a configuration, as the applied steering torque becomes larger, the core torsion bar 3A twists, while the inner tubular torsion bar 3Bd is rotating a distance corresponding to the gap dg1 only. In this situation, the outer tubular torsion bar 3Bb rotates a distance dg3 corresponding to the rotational angle β in conjunction with the inner tubular torsion bar 3Bd. Sequentially, after the meshing teeth 3Bct and 3Bdt mesh each other, not only the core torsion bar 3A but also the inner tubular torsion bars 3Bc and 3Bd twist, while the inner tubular torsion bar 3Bb rotates a distance corresponding to "dg2-dg3" only. After the meshing teeth 3Bat and 3Bbt mesh each other, not only the core torsion bar 3A and the inner tubular torsion bars 3Bc and 3Bd but also the inner tubular torsion bar 3Ba and 3Bb twist. Thus, as the applied steering torque becomes larger, it is possible to increase the elasticity of the torsion bar.

Further, in one embodiment of the present disclosure, it is assumed that a pair of torsion bar parts are two tubular torsion bars (tubular parts). In fact, however, three or more tubular torsion bars may be used. For example, a tubular torsion bar 3Bf, not illustrated, may be arranged between the tubular torsion bar 3Ba and the tubular torsion bar 3Bb to have a coupling configuration, such that a meshing tooth of one end of the tubular torsion bar 3Ba and a meshing tooth of one end of the tubular torsion bar 3Bb may mesh each other, a meshing tooth of the other end of the tubular torsion bar 3Bf and a meshing tooth of the tubular torsion bar 3Bb may mesh each other.

Effects in Embodiments in the Present Disclosure

In embodiments of the present disclosure, the following effects are brought out.

(1) In the torque sensor in one embodiment of the present disclosure, the first torsion bar and the second torsion bar are arranged in parallel. The second torsion bar includes a pair of torsion bar parts, which couple each other when the twist of the first torsion bar reaches a predefined rotational angle, and which twists in conjunction with the first torsion bar.

Accordingly, by increasing the torque resolution around the center (neutral position) of the steering wheel to contribute to the detailed control, it is possible to provide an electric power steering device that achieves a comfortable feeling around the center (neutral position) of the steering wheel. In addition, after the twist of the torsion bar is detected and converted into an electrical signal, a control signal around the center (neutral position) of the steering wheel does not have to be amplified or switched by a circuit or operation at a stage of being converted into a control value.

(2) The elasticity of the second torsion bar is larger than the elasticity of the first torsion bar.

Therefore, a higher physical quantity of the gain than that in a prior art technology is obtainable until reaching the meshing location (meshing point) where the meshing teeth mesh each other. In addition, the meshing teeth exceed the meshing point, strong elasticity is generated and a displacement in the rotational direction is suppressed. There is no concern that the first torsion bar twists too much or the reliability degrades.

(3) A pair of torsion bar parts are coaxially arranged tubular parts, which accommodate the first torsion bar in the inside thereof, which secure both ends of the first torsion bar in the inside thereof, and which couple with each other by meshing teeth when the twist of the first torsion bar reaches a predefined rotational angle.

Thus, the torsion bars are configured to have a plural stage structure (hierarchical structure) by accommodating and coupling the first torsion bar in the inside of the second torsion bar, it is possible to make an optimal structure where the second torsion bar twists in conjunction with the twist of the first torsion bar. Further, as the first torsion bar is accommodated in the inside of the second torsion bar to form a single torsion bar in appearance, it is also easy to replace the torsion bar in a prior art technology.

(4) The number of the meshing teeth is any one of one to seven.

Hence, while securing an enough size for each meshing tooth, it is possible to secure sufficient durability.

(5) The second torsion bar may have a gap of a predefined rotational angle between the meshing teeth, so that an elastic body may be filled in the gap.

Accordingly, in the second torsion bar, it is possible to suppress an operation sound or knocking when the meshing teeth mesh each other. Further, an inflection point of the meshing point in the graph illustrated in FIG. 5 can be adjusted by adjusting the elasticity of the elastic body, so that smooth coupling of a pair of torsion bar parts can be achieved.

(6) The second torsion bar has a nested structure in which plural sets of the above torsion bar parts having different sizes are assembled in an order of size.

Accordingly, the plural stage structure (hierarchical structure) of the torsion bar can be achieved most easily.

(7) The torque sensor in one embodiment of the present disclosure can be mounted on an electric power steering device (EPS).

Therefore, it is possible to provide a comfortable feeling around the center (neutral position) of the steering wheel 1a in the electric power steering device (EPS).

There is provided a torque sensor, in one embodiment of the present disclosure, including: a first torsion bar; and a second torsion bar configured to include a pair of torsion bar parts, the pair of torsion bar parts being arranged in parallel to the first torsion bar, being coupled with each other when the first torsion bar twists a predefined rotational angle, and twisting in conjunction with the first torsion bar. Elasticity of the second torsion bar may be larger than the elasticity of the first torsion bar. The pair of torsion bar parts may be configured to be tubular parts coaxially arranged, to accommodate the first torsion bar in an inside of the tubular parts, to secure both ends of the first torsion bar in the inside of the tubular parts, and to mesh each other by meshing teeth, when the first torsion bar twists the predefined rotational angle. The number of the meshing teeth may be any one of one to seven. The second torsion bar may be configured to have a gap of the predefined rotational angle between the meshing teeth, and an elastic body is filled in the gap. The second torsion bar may have a nested structure in which a plurality of the pair of torsion bar parts having different sizes from each other are assembled in an order of size. The above-described torque sensor can be mounted on an electric power steering device (EPS).

Advantageous Effects of Invention

According to one aspect of the present disclosure, it is possible to give a natural and comfortable feeling to a driver (driver) by increasing the physical quantity of the torque sensor around the center of the steering wheel (neutral position), regardless of electric drawbacks of quantization error, phase delay, processing capability, or the like.

Heretofore, this application claims priority from Japanese Patent Application No. 2014-2471 (filed on Jan. 9, 2014), which is incorporated herein by reference in its entirety.

Also, the embodiments of the present disclosure have been described in detail, but in practice, the present disclosure is not limited to the above-described embodiments, and Any changes may be made in these embodiments without departing from the principles and spirit of the present disclosure.

In other words, herein, while a limited number of embodiments have been described with illustration, it should be apparent that the present disclosure is not limited to them and modifications and adaptations to each of the embodiments based on the above disclosure may occur to one skilled in the art.

REFERENCE SIGNS LIST

1 . . . input shaft, 1a . . . steering wheel, 2 . . . output shaft, 2a . . . pinion shaft, 3 . . . torsion bar, 3A . . . core torsion bar (first torsion bar), 3B . . . tubular torsion bar (second torsion bar), 3Ba, 3Bb . . . tubular torsion bar parts (a pair of torsion bar parts), 3Bc, 3Bd . . . tubular torsion bar parts (a pair of torsion bar parts), 3Bat, 3Bbt, 3Bct, 3Bdt . . . meshing teeth, 4 . . . rack, 4a . . . tie rod, 5 . . . housing, 5a . . . input shaft side housing portion, 5b . . . output shaft side housing portion, 6a, 6b, 6c . . . bearings, 7 . . . worm wheel, 8 . . . worm, 9 . . . controller (ECU), 9a . . . vehicle speed sensor, 9b . . . steering angle sensor, 9c . . . battery, 9d . . . ignition switch, 9e . . . electric motor, 10 . . . torque sensor, 11 . . . sensor shaft (rotor), 12 . . . cylindrical member, 13a, 13b . . . detection coils, 14 . . . yoke cover, 15a, 15b . . . yokes, 16 . . . coil side connector, 17 . . . circuit board, 18 . . . coil bobbin, 19 . . . board side connector

The invention claimed is:

1. A torque sensor, comprising:
a first torsion bar; and
a second torsion bar configured to include a pair of torsion bar parts, the pair of torsion bar parts being arranged in parallel to the first torsion bar, being coupled with each other when the first torsion bar twists a predefined rotational angle, and twisting in conjunction with the first torsion bar,
wherein the second torsion bar is configured to have a nested structure in which a plurality of the pair of torsion bar parts having different sizes from each other are assembled in an order of size.

2. The torque sensor according to claim 1, wherein in the second torsion bar having the nested structure, the torsion bar parts are configured to sequentially mesh from an inner side, and the torsion bar part on an outer side is configured to have larger elasticity than the elasticity of the torsion bar part on the inner side.

3. The torque sensor according to claim 1, wherein the pair of torsion bar parts are configured to be tubular parts coaxially arranged, to accommodate the first torsion bar in an inside of the tubular parts, to secure both ends of the first torsion bar in the inside of the tubular parts, and to mesh each other by meshing teeth, when the first torsion bar twists the predefined rotational angle.

4. A torque sensor, comprising:
a first torsion bar; and
a second torsion bar configured to include a pair of torsion bar parts, the pair of torsion bar parts being arranged in parallel to the first torsion bar, being coupled with each other when the first torsion bar twists a predefined rotational angle, and twisting in conjunction with the first torsion bar,
wherein the pair of torsion bar parts are configured to be tubular parts coaxially arranged, to accommodate the first torsion bar in an inside of the tubular parts, to secure both ends of the first torsion bar in the inside of the tubular parts, and to mesh each other by meshing teeth, when the first torsion bar twists the predefined rotational angle, and
wherein the second torsion bar is configured to have a gap of the predefined rotational angle between the meshing teeth, and an elastic body is filled in the gap.

5. The torque sensor according to claim 3, wherein the number of the meshing teeth is any one of one to seven.

6. The torque sensor according to any one of claim 1, wherein elasticity of the second torsion bar is larger than the elasticity of the first torsion bar.

7. An electric power steering device comprising the torque sensor according to any one of claim 1.

8. The torque sensor according to claim 2, wherein the pair of torsion bar parts are configured to be tubular parts coaxially arranged, to accommodate the first torsion bar in an inside of the tubular parts, to secure both ends of the first torsion bar in the inside of the tubular parts, and to mesh each other by meshing teeth, when the first torsion bar twists the predefined rotational angle.

9. The torque sensor according to claim 4, wherein the number of the meshing teeth is any one of one to seven.

10. The torque sensor according to claim 2, wherein elasticity of the second torsion bar is larger than the elasticity of the first torsion bar.

11. The torque sensor according to claim 3, wherein elasticity of the second torsion bar is larger than the elasticity of the first torsion bar.

12. The torque sensor according to claim 4, wherein elasticity of the second torsion bar is larger than the elasticity of the first torsion bar.

13. The torque sensor according to claim 5, wherein elasticity of the second torsion bar is larger than the elasticity of the first torsion bar.

* * * * *